United States Patent [19]

Florence

[11] Patent Number: 5,667,119
[45] Date of Patent: Sep. 16, 1997

[54] PACKAGED FAST FOOD AND CONDIMENT HOLDING APPARATUS

[76] Inventor: Patricia J. Florence, 7661 Dyke Rd., Fairhaven, Mich. 48023

[21] Appl. No.: 458,979

[22] Filed: Jun. 2, 1995

Related U.S. Application Data

[63] Continuation-in-part of Ser. No. 182,436, Jan. 18, 1994, abandoned.

[51] Int. Cl.⁶ ........................................................ B60N 3/10
[52] U.S. Cl. .......................... 224/482; 224/281; 224/559; 224/564
[58] Field of Search ................ 224/42.45 R, 42.46 R, 224/42.46 B, 275, 482, 483, 281, 926, 559, 564

[56] References Cited

U.S. PATENT DOCUMENTS 4,981,217  1/1991  Lim ............................ 224/482 X
5,007,612  4/1991  Manfre ..................... 248/231.71 X

*Primary Examiner*—Renee S. Luebke
*Attorney, Agent, or Firm*—VanOphem Meehan & VanOphem, P.C.

[57] ABSTRACT

A portable storage container has a primary contoured opening at one end with resilient straps spanning the opening for supporting a packaged fast food product and a secondary rectangular opening for receiving and storing the condiments accompanying the fast food. The opposing end provides for removably attaching the portable storage container to the automotive vehicle.

7 Claims, 5 Drawing Sheets

PACKAGED FAST FOOD AND CONDIMENT HOLDING APPARATUS

CROSS REFERENCE TO RELATED APPLICATIONS

This application is a continuation-in-part application to U.S. Ser. No. 08/182,436, filed Jan. 18, 1994, now abandoned.

BACKGROUND OF THE INVENTION

1. Field of the Invention

In a transportation vehicle it is usually difficult and messy to eat fast food products, such as french fries and ketchup. The reason for the difficulty is during consumption there is not a suitable location for either the packaged fast food product or its associated condiment. They are, therefore, often placed in a location that allows them to move around and spill, which may distract the driver and possibly contribute to accidents. Accordingly, a need for a packaged fast food and condiment holder was recognized.

2. Description of the Prior Art

Food trays for automobiles have been the subject of improvement patents for some time. For example, McAnallen, U.S. Pat. No. 3,268,133, teaches a food tray which can be hung over the back of the front seat of an automobile. Ransom, U.S. Pat. No. 5,037,162, teaches a truck utility tray having heated cup holders, a low intensity light as well as an interlocking cup base that prevents tipping and spilling of beverages. Other patents such as Anderson et al, U.S. Pat. No. 5,259,580, teach floor or console mounted devices for holding consumable beverages. Lane, Jr., U.S. Pat. No. 4,854,466 teaches a food product container wherein the condiment container is suspended from a further package container to enable a consumer to hold a package container in one hand, have a free hand available to handle the consumable food, and still have easy access to the condiments contained in the suspended container. However, this device could not be easily used when operating an automobile. Accordingly what is needed is an apparatus designed specifically to position and secure both a packaged fast food product and its associated condiment container in an automobile. The objective of this invention is to provide such an apparatus.

SUMMARY OF THE INVENTION

This invention pertains to an apparatus, portable or permanent, which provides a receptacle that positions and secures both a ready to eat packaged fast food product and its associated condiment for consumption by the operator of a moving vehicle.

A typical application for this holder is a french fry and ketchup container but the holder obviously can be used for other fast food products and condiments such as, but not limited to, chicken nuggets and barbecue sauce, onion rings and mustard, hash brown patties and ketchup, etc.

The apparatus consists of a body that contains an opening and underlying support for receiving the packaged fast food container in one portion thereof to position and secure the packaged fast food product. The body also contains a receptacle to store and secure the condiment container. The apparatus can be connected to an interior surface of the vehicle in any of the following manners;

Suction cups assembled to the body of the apparatus are attached to a smooth (non-textured) surface such as a window, fiber glass, FORMICA®, etc.

Hook and loop fasteners, commonly known as VELCRO®, assembled to the body of the apparatus and a vehicle surface.

A hook flange that is part of the body can slide between the window and trim panel such as an inner door trim panel.

A permanent attachment application can be an attachment feature that is part of a seat back, trim panel, instrument panel, or console which provides a tray-type body that folds down out of the seat back etc., and contains an opening and underlying support for the packaged food container and associated condiment container.

Another permanent attachment application can be an attachment feature that again is a part of a seat back, trim panel, instrument panel, or console that contains a tray-type body which slides out of and retracts into the seat back, trim panel, etc., which provides the storage features.

It is a primary objective of the invention to provide a packaged fast food and condiment container apparatus which is:

a) of low cost;

b) not bulky and does not interfere with the drivability of the vehicle;

c) easy to stow;

d) sanitary—no clean up required; just remove and dispose of food package and condiment container;

e) quickly fastened and unfastened (for portable apparatus); and f) easily accessible to the user and storable (for a permanent apparatus).

The other objects, features and advantages of the invention will be more readily apparent from the following description of preferred and other embodiments and the appended claims, when taken in conjunction with the accompanying drawings.

DETAILED DESCRIPTION OF THE PREFERRED EMBODIMENT

The present invention consists of the following elements:

1. A body which joins the primary container receptacle and secondary container receptacle to the attachment portion;
2. A Primary receptacle which is an opening in the body to accept, position, and secure a packaged fast food product;
3. A secondary receptacle which is also an opening in the body to accept, position, and secure a condiment container; and
4. An attachment portion which is a part of or assembled to the body and which provides for the apparatus to be permanently or temporarily joined to a transportation vehicle.

Figure 1:
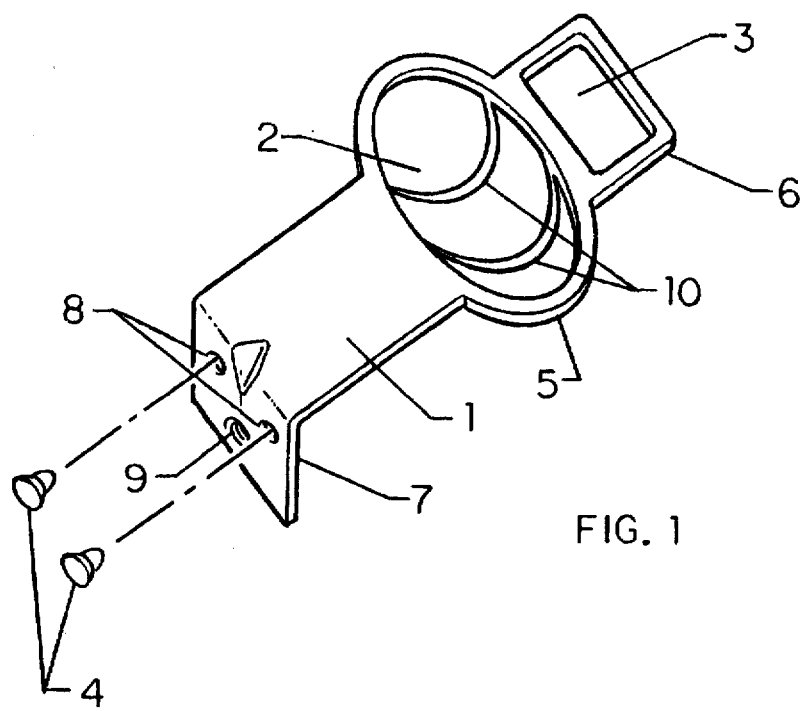
FIG. 1 is an exploded perspective view showing an assembled apparatus (portable) that is joined to the vehicle with suction cups.

FIG. 1 illustrates a preferred embodiment of a portable packaged fast food and condiment holder. The apparatus has a body 1 of rigid material, preferably of a suitable plastic or metallic material. The body has a large contoured cavity 2 to accept and secure a packaged fast food product and a smaller rectangular cavity 3 to accept and secure a condiment container. A frame 5 outlines the large cavity and a frame 6 outlines the small cavity. These frames are an integral part of the body that define the cavities form each other. Underneath the large contoured cavity 2 there are straps 10 that help support the packaged food product. A rear flange 7 is part of the body. The rear flange 7 contains holes 8 that accept suction cups 4 which provide for securing the apparatus to a convenient portion of a transportation vehicle. On the lower section of the rear flange is a threaded hole 9 which is adapted to receive a leveling screw 13 as more clearly illustrated in FIG. 2.

Figure 2:
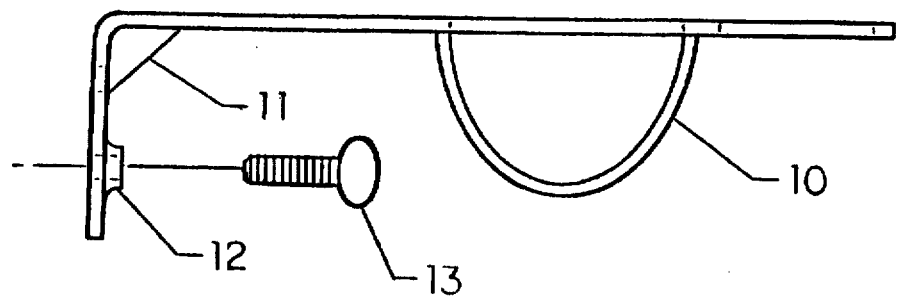
FIG. 2 is an exploded partial side view of the apparatus of FIG. 1 and showing further details of the features thereof.

FIG. 2 is a side view of the apparatus shown in FIG. 1. There is an angle wedge 11 between the rear flange and the body for extra support. On the inside lower section of the rear flange 7 is a raised area 12 surrounding the threaded hole 9, which protrudes from the flange 7. This raised area 12 is to provide a longer thread length for the leveling screw 13. The leveling screw 13 is made from a rigid material, preferably of plastic or metallic material, and used to level the apparatus when attached to a curved surface. FIG. 2 also illustrates the side view of the straps 10 that provide support for the packaged food product.

Figure 3:
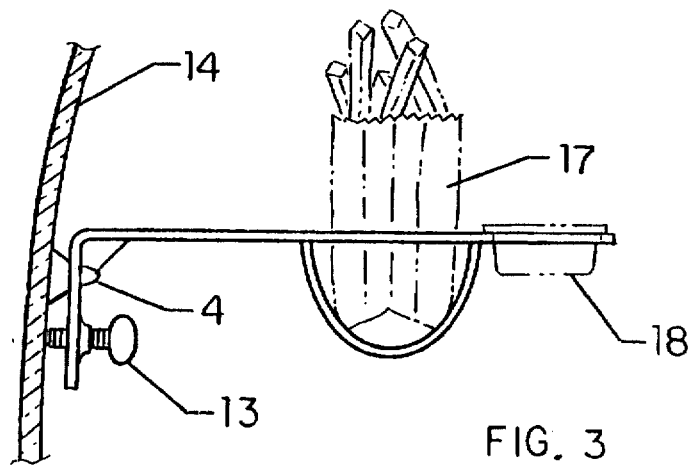
FIG. 3 is a side view of the apparatus that is shown in FIGS. 1 and 2, illustrating apparatus in use, attached to a window.

FIG. 3 is a side view illustrating the apparatus during usage. The apparatus is attached to a window 14 by the suction cups 4 and is leveled with the leveling screw 13. A package of french fries 17 is placed in the large contoured cavity 2 and a container of ketchup 18 is placed in front of the french fries in the smaller rectangular cavity 3.

Figure 4:
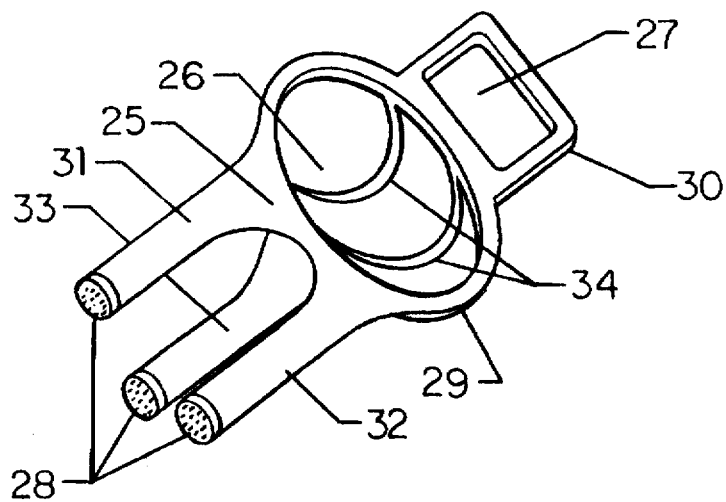
FIG. 4 is a perspective view of an alternative portable configuration of the invention, illustrating hook and loop fasteners (commonly know as VELCRO®) assembled to the end of protruding fingers to provide the means of attachment.

FIG. 4 illustrates an alternative portable embodiment. This apparatus has a body 25 of rigid material, preferably of a suitable plastic or metallic material. In the body there is a large contoured cavity 26 to accept and secure the packaged fast food product and a small rectangular cavity 27 to accept and secure a condiment container. A frame 29 outlines the large cavity and a frame 30 outlines the small cavity. These frames are part of the body that define the cavities. Underneath the large cavity 26 there are straps 34 that help support the packaged food product. On the rear section of the body are three protruding fingers, two of these fingers 31 and 32 are on the upper part of the body, while the third finger 33 is on the lower part of the body centered between the two upper fingers as more clearly illustrated in FIG. 5. These three fingers have a hook fastener 28 of a commonly known VELCRO® hook and loop fastener, mounted to the ends. These three fingers provide the means to secure the apparatus to an internal surface of a transportation vehicle.

Figure 5:
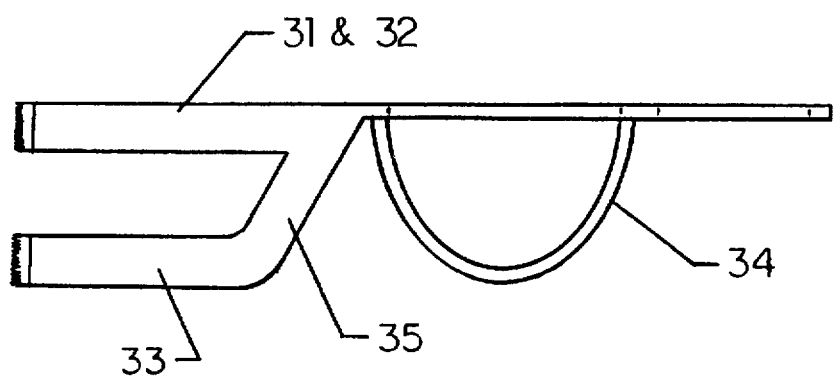
FIG. 5 is a side view of the apparatus of FIG. 4.

FIG. 5 is a side view of the apparatus shown in FIG. 4. The upper fingers 31 and 32 and the lower finger 33 are part of the body that is connected by a mid-body section 35. This figure gives another view of the straps 34 that help support the packaged food product.

Figure 6:
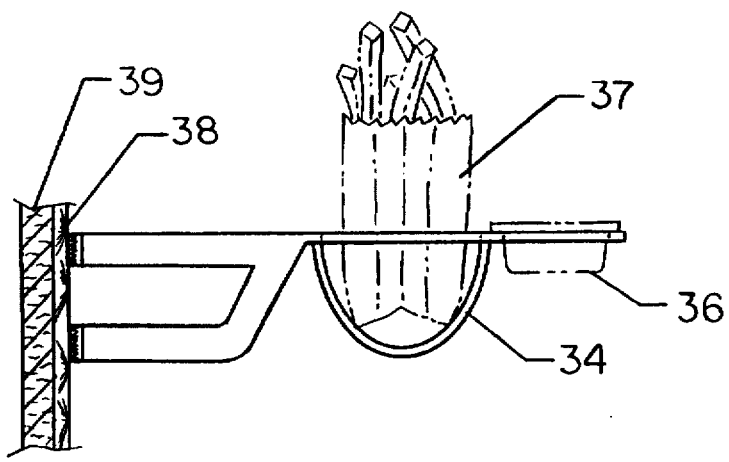
FIG. 6 is a side view of the apparatus that is shown in FIGS. 4 and 5, illustrating the apparatus in use, attached to an inner door panel.

FIG. 6 is a side view illustrating the apparatus in use. The apparatus is attached to a mating looped fastener 38 that is attached to a trim panel 39, which is part of a door assembly (not shown). A package of french fries 37 is placed in the large cavity 26 and a container of ketchup 36 is placed in front of the french fries in the smaller cavity 27. This figure gives another view of the straps 34 that help support the packaged food product.

Figure 7:
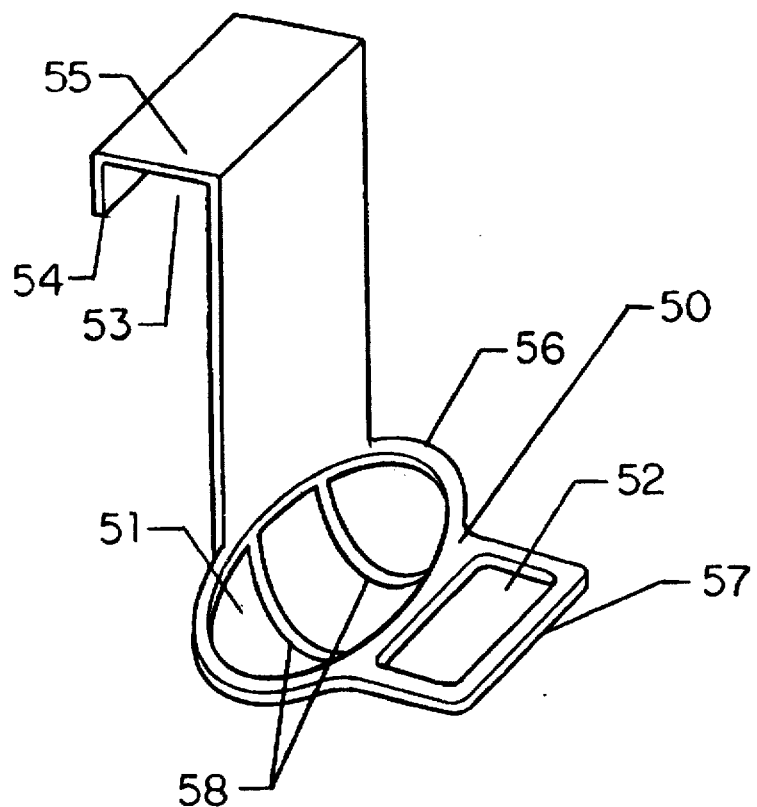
FIG. 7 is a perspective view of another alternative portable configuration, of the apparatus which in this embodiment is of one piece construction and is attached by a hooked flange that slides between a window and door trim panel.

FIG. 7 illustrates an alternate portable embodiment. The apparatus has a body 50, again of rigid material, preferably of a suitable plastic or metallic material. In the lower section of the body 50 there is a large contoured cavity 51 to accept and secure the packaged fast food product and a small cavity 52 to accept and secure a condiment container. A frame 56 outlines the large cavity and a frame 57 outlines the small cavity. These frames are part of the body 50 that define the cavities from each other. The upper vertical part of the body has a hooked flange 53 that provides the means to secure the apparatus in a transportation vehicle. This hooked flange secures the apparatus when the vertical section of the hook 54 on the flange is slid between a door trim panel and window (see FIG. 8), while the horizontal section 55 of the flange rests on top of the door trim panel. Underneath the large cavity 51 there are straps 58 that help support the packaged food product.

Figure 8:
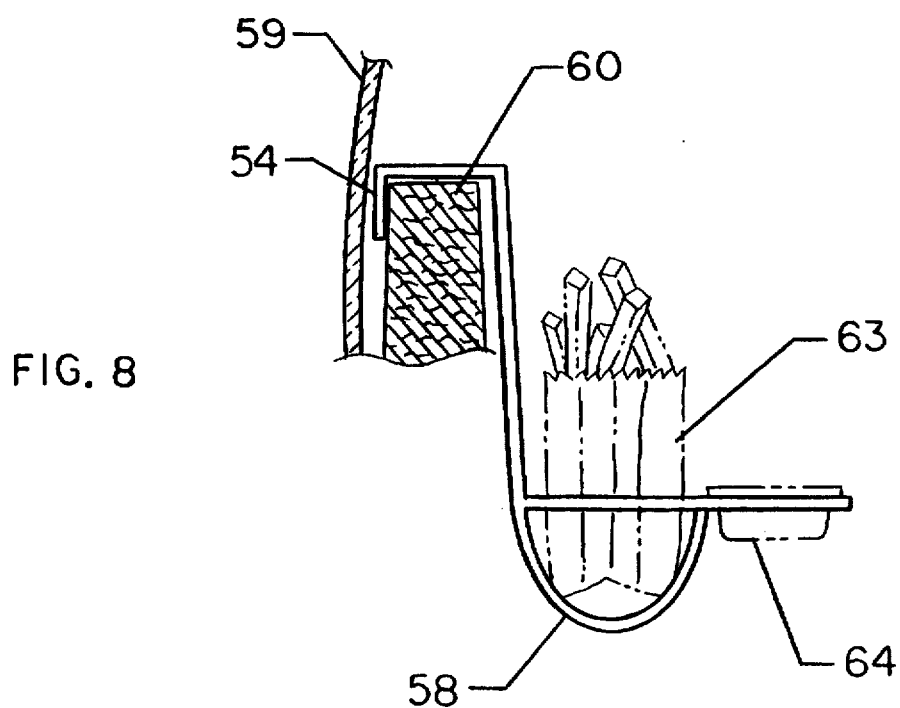
FIG. 8 is a side view of the same apparatus that is shown in FIG. 7 attached to an inner door trim-panel.

FIG. 8 is a side view illustrating the apparatus during usage. The apparatus is attached when the hooked flange 53 is positioned between a window 59 and a door trim panel 60. A package of french fries 63 is placed in the large cavity 51 and a container of ketchup 64 is placed in front of the french fries in the smaller cavity 52. This figure gives another view of the straps 58 that help support the packaged food product.

Figure 9:
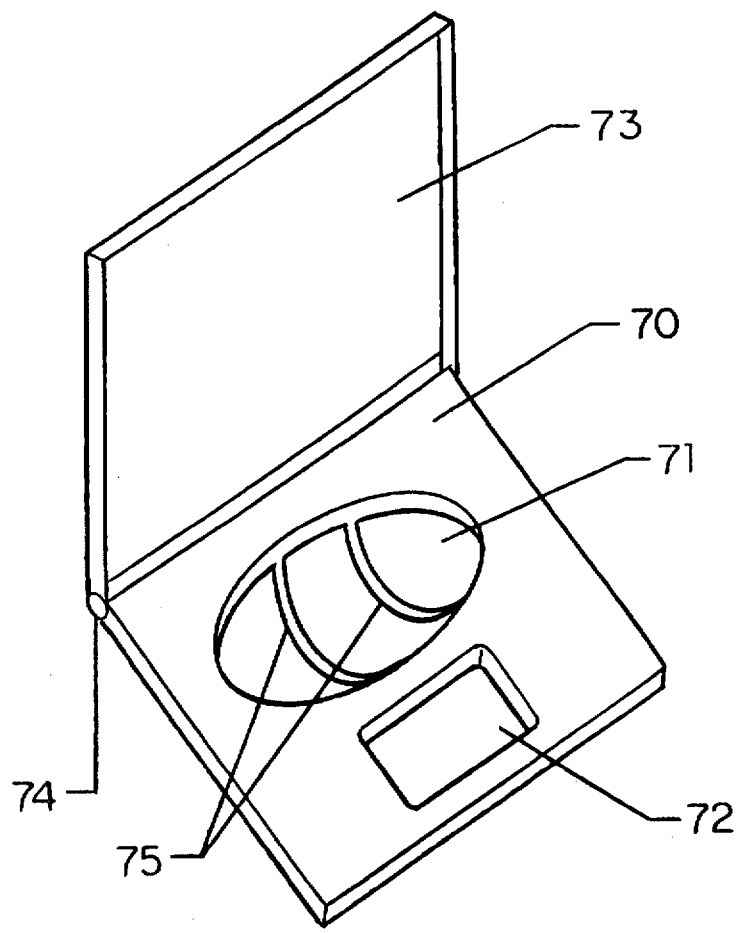
FIG. 9 is a perspective view of a permanent attachment configuration that can be part of a vehicle, having the same body components but which can be part of a trim panel or seat back and which can flip-down for usage and flip-up for storage.

FIG. 9 illustrates a permanent embodiment consisting of a packaged fast food and condiment holder. The apparatus has a body 70 of rigid material, again preferably of a suitable plastic or metallic material. The body has a large cavity 71 to accept and secure the packaged fast food product and a small cavity 72 to accept and secure a condiment container. This apparatus is permanently attached to a transportation vehicle when the rear container panel 73 is made a part of a seat back, instrument panel, dashboard, or console. The body 70 is stowed when it is folded up against the rear container panel 73 by means of any convenient hinge device 74. Underneath the large cavity 71 there are straps 75 to hold the packaged food product as is evident from the other illustrated embodiments.

Figure 10:
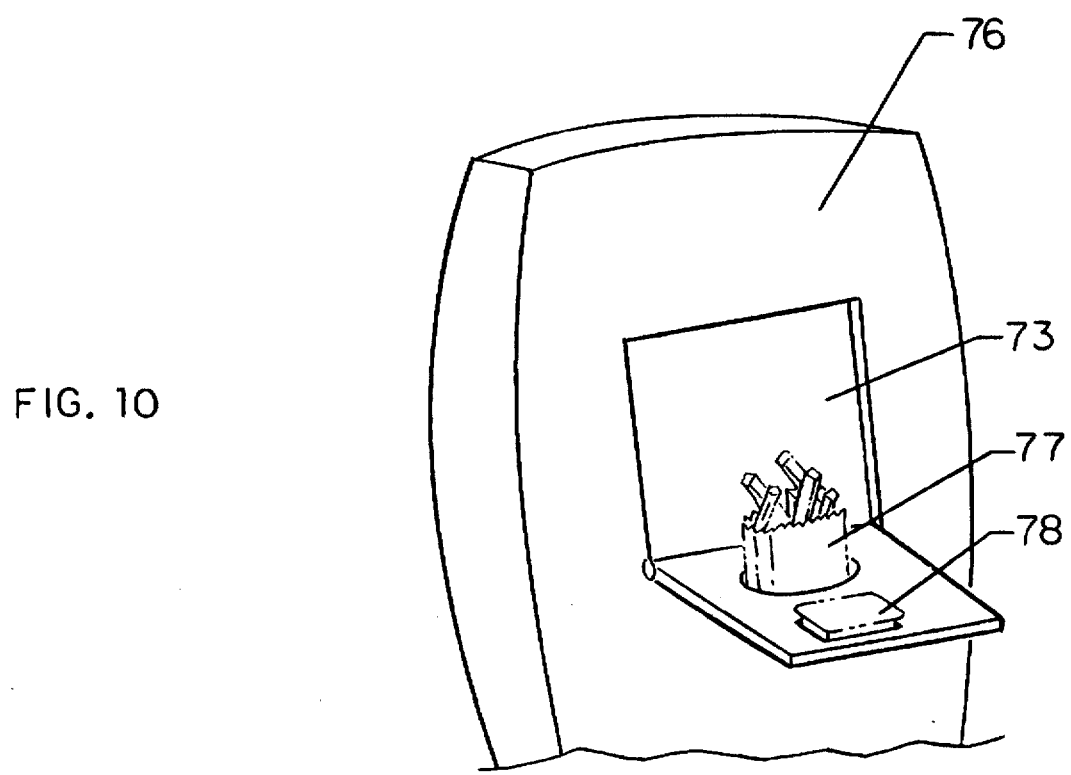
FIG. 10 is a perspective view of the same apparatus that is shown in FIG. 9, showing the apparatus in use and as part of a seat back.

FIG. 10 is a perspective view illustrating the apparatus of FIG. 9 during usage. The apparatus is permanently attached when the rear container panel 73 is a part of or molded into the back of a seat 76. A package of french fries 77 is placed in the large cavity and a container of ketchup 78 is placed in front of the french fries in the smaller cavity.

Figure 11:
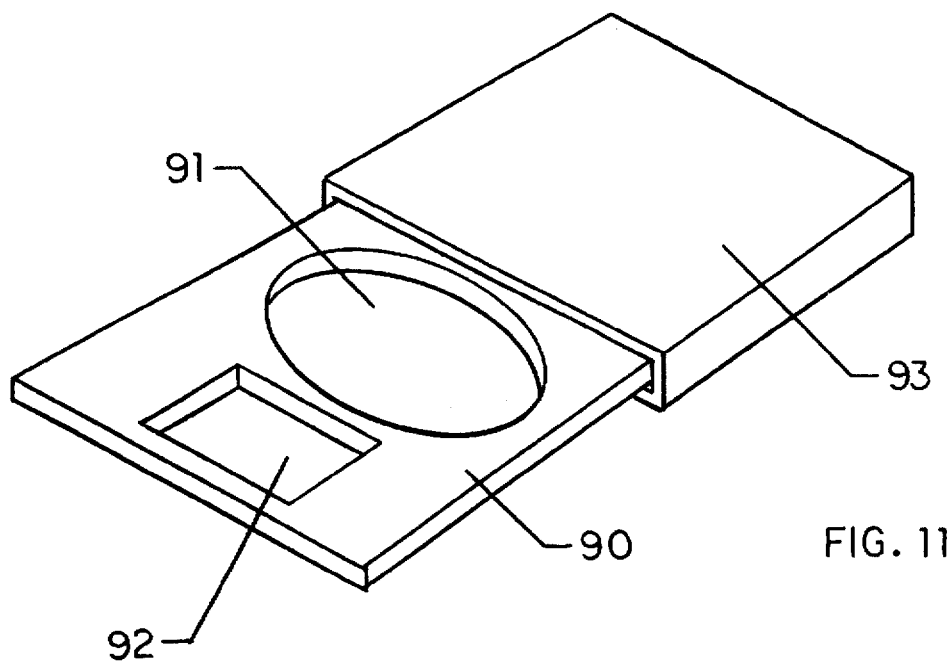
FIG. 11 is a perspective view of another permanent configuration that can be part of a vehicle instrument panel, dashboard or console having the same body components and which slides-out for usage and retracts-in for storage.
Figure 12:
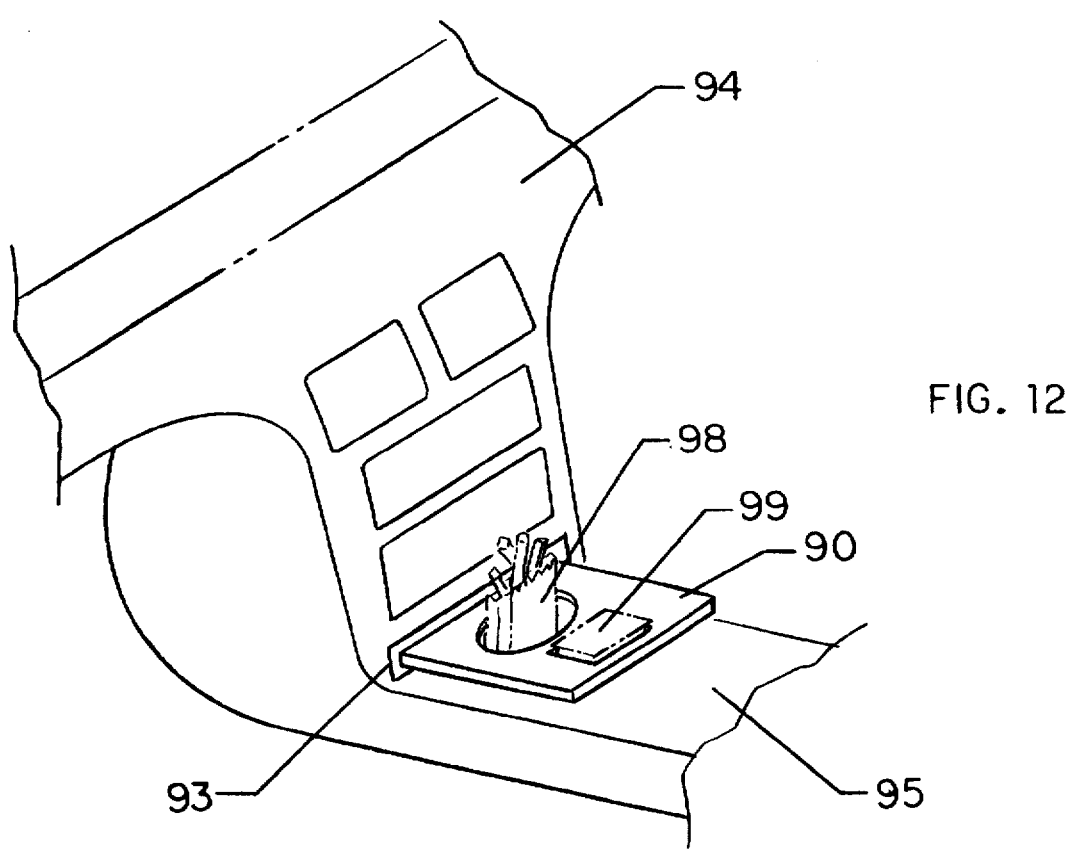
FIG. 12 is a perspective view of the apparatus that is shown in FIG. 11, showing the apparatus in use, and as a part of an instrument panel.

FIG. 11 is an alternative permanent embodiment of the food and condiment holder. This apparatus has a body 90 of rigid material, again preferably of a suitable plastic or metallic material. The body has a large cavity 91 to accept and secure the packaged fast food product and a small cavity 92 to accept and secure a condiment container. This apparatus is permanently attached to a transportation vehicle when the retractor unit 93 is a part of an instrument panel, dashboard, or console as shown in FIG. 12. The body 90 slides out of the retractor unit 93 for usage and into the unit for storage.

FIG. 12 is a perspective view illustrating the apparatus of FIG. 11 during usage. The apparatus is permanently attached to a vehicle when the retractor unit 93 is a part of or molded into the instrument panel 94 or console 95. A package of french fries 98 is placed in the large cavity and a container of ketchup 99 is placed in front of the french fries in the smaller cavity.

What is claimed is:

1. A portable storage container for use in an automotive vehicle to temporarily store packaged fast food and associated condiments in an upright position, said portable storage container comprising:

a rigid planar body having one end defining a contoured opening therein for receiving said packaged fast food, a frame portion surrounding said contoured opening and an extended portion defining an opposite end of said rigid planar body;

a rectangular hole located in said extended portion of said rigid planar body, said rectangular hole spaced adjacent to said contoured opening for receiving said condiments for said fast food;

at least one support strap having one end attached to said frame portion surrounding said contoured opening of said rigid planar body and an opposite end attached to said frame portion at a diametrically opposed location of said frame portion surrounding said contoured opening of said rigid planar body such that said at least one support strap spans across said contoured opening to support said packaged fast food; and means for mounting said rigid planar body in said automotive vehicle.

2. The portable storage container as claimed in claim 1 wherein said mounting means are temporary mounting means, said temporary mounting means comprising:

a plurality of fingers each having one end attached to said rigid planar body and an opposite end extending in a direction opposite to said one end, each of said plurality of fingers having an end face; and a plurality of hook fasteners attached to each end face of said plurality of fingers such that said plurality of hook fasteners communicate with a mutually complementary plurality of loop fasteners mounted to said automotive vehicle to support said portable storage container in an upright position in said automotive vehicle.

3. The portable storage container as claimed in claim 1 wherein said mounting means are temporary mounting means, said temporary mounting means comprising:

a rear flange transversely attached to said rigid planar body; and means for attaching said transverse rear flange to said automotive vehicle.

4. The portable storage container as claimed in claim 3 wherein said means for attaching further comprises:

a pair of holes located in said rear flange;

a suction cup member mounted in each of said pair of holes such that said suction cup members are directly mounted to a surface of said automotive vehicle to depend said portable storage container therefrom;

a threaded hole located in said rear flange; and means for leveling said rigid planar body, said leveling means being mounted in said threaded hole to coact with said surface of said automotive vehicle whereby a user may adjust said rigid planar body to a horizontally level orientation.

5. A portable storage container for use in an automotive vehicle to temporarily store packaged fast food and associated condiments in an upright position, said portable storage container comprising:

a rigid body having one end defining a contoured opening therein for receiving said packaged fast food, a frame portion surrounding said contoured opening and an extended portion defining an opposite end of said rigid body;

a rectangular hole located in said frame portion of said rigid body, said rectangular hole spaced adjacent to said contoured opening for receiving said condiments for said fast food;

at least one support strap having one end attached to said frame portion surrounding said contoured opening of said rigid body and an opposite end attached to said frame portion at a diametrically opposed location of said frame portion surrounding said contoured opening of said rigid body such that said at least one support strap spans across said contoured opening to support said packaged fast food; and means for mounting said rigid body in said automotive vehicle, said mounting means being attached to said opposite end of said rigid body.

6. The portable storage container as claimed in claim 5 further comprising:

a rear flange transversely attached to said extended portion of said rigid body; and a hooked flange attached to said rear flange, said hooked flange having a vertical portion for hooking said portable storage container over a substantially vertical surface on said automotive vehicle, such that said portable storage container depends from said vertical surface when in use and may be removed from said vertical surface when not in use.

7. A storage container for use in an automotive vehicle to temporarily store packaged fast food and associated condiments in an upright position, said storage container comprising:

a rigid planar body having one end defining a contoured opening therein for receiving said packaged fast food, a frame portion surrounding said contoured opening and an extended portion defining an opposite end of said rigid planar body;

a rectangular hole located in said extended portion of said rigid planar body, said rectangular hole spaced adjacent to said contoured opening for receiving said condiments for said fast food;

at least one support strap having one end attached to said frame portion surrounding said contoured opening of said rigid planar body and an opposite end attached to said frame portion at a diametrically opposed location of said frame portion surrounding said contoured opening of said rigid planar body such that said at least one support strap spans across said contoured opening to support said packaged fast food;

means for permanently mounting said storage container in said automotive vehicle, said permanent mounting means comprising a panel mounted to said automotive vehicle; and hinge means having a first hinge portion attached to said rigid planar body and a second hinge portion attached to said panel, said first and second hinge portions adapted to cooperate with each other to allow pivoting movement of said rigid planar body with respect to said panel such that said rigid planar body pivots into said panel for storage therein.

\* \* \* \* \*